(12) United States Patent
Cox

(10) Patent No.: US 12,493,833 B2
(45) Date of Patent: Dec. 9, 2025

(54) SYSTEM AND METHODS FOR IMPROVED HEALTHY TRUCK STOP

(71) Applicant: Lisa Cox, Frankfort, IL (US)

(72) Inventor: Lisa Cox, Frankfort, IL (US)

(73) Assignee: Enpro, Inc, Addison, IL (US)

( * ) Notice: Subject to any disclaimer, the term of this patent is extended or adjusted under 35 U.S.C. 154(b) by 0 days.

(21) Appl. No.: 18/598,922

(22) Filed: Mar. 7, 2024

(65) Prior Publication Data
US 2024/0303557 A1    Sep. 12, 2024

Related U.S. Application Data

(60) Provisional application No. 63/450,493, filed on Mar. 7, 2023.

(51) Int. Cl.
*G06Q 10/02*    (2012.01)
*G01C 21/36*    (2006.01)

(52) U.S. Cl.
CPC ......... *G06Q 10/02* (2013.01); *G01C 21/3679* (2013.01)

(58) Field of Classification Search
CPC ............................ G06Q 10/02; G01C 21/3679
USPC ............................................................. 705/5
See application file for complete search history.

(56) References Cited

U.S. PATENT DOCUMENTS

| | | | |
|---|---|---|---|
| 2009/0150156 A1* | 6/2009 | Kennewick | G01C 21/3608 704/275 |
| 2016/0109252 A1* | 4/2016 | Caine | G01C 21/3682 701/533 |
| 2017/0116546 A1* | 4/2017 | Alonzo-Reynaud | G06Q 30/0617 |
| 2018/0218434 A1* | 8/2018 | Smith | G06Q 30/0241 |
| 2021/0334736 A1* | 10/2021 | Mains, Jr. | G06Q 10/06311 |
| 2022/0092488 A1* | 3/2022 | Petersen | G06Q 10/02 |

OTHER PUBLICATIONS

"Long-Haul Truck Drivers Want Healthful Meal Options at Truck-Stop Restaurants" Published by Elsevier (Year: 2007).*

* cited by examiner

*Primary Examiner* — Zeina Elchanti
(74) *Attorney, Agent, or Firm* — Patzik, Frank & Samotny Ltd

(57) ABSTRACT

The present disclosure is directed to an improved truck driving system and methods for improved truck driving, including solving well-known shortcomings in the truck driving industry. The system and software application, in which a truck driver or individual taking a long road trip, uses the app and system, along with third-party or integrated information about the scheduled route, to locate healthy truck stop stations, reserves a particular time for arriving, parking, exercising, taking classes, attending to hygiene and grooming, among other services and goods. The application also integrates with proprietary or third-party apps to provide advice on proper and healthier foods to purchase at the specific locations, and for safely driving and transporting goods.

1 Claim, 3 Drawing Sheets

SYSTEM AND METHODS FOR IMPROVED HEALTHY TRUCK STOP

PRIORITY STATEMENT

The present application claims the benefit of U.S. Provisional Patent Application No. 63/450,493, titled SYSTEM AND METHODS FOR IMPROVED HEALTHY TRUCK STOP, filed Mar. 7, 2023, the foregoing incorporated by reference herein.

FIELD OF THE DISCLOSURE

The present disclosure relates to a system and methods for improving the health and safety of truck drivers by providing a healthy truck stop, comprising software applications, equipment, classes and healthy meals or snacks along the route that the truck driver is traveling. In particular, the present disclosure relates to a website or mobile software application or app that provides directions and easy access to stopping locations that can temporarily accept reservations for parking purposes and reservations for providing workout equipment, cardiovascular classes, massages, haircut services, showers, and other exercise and personal hygiene services, along with healthy food options for meals or snacks, to be used and/or consumers in a short time span of an hour or less.

The novelty of the present disclosure is a systems and methods for improving the health and safety of truck drivers by providing a software application for use over the Internet or a cellular network, or both, that incorporates location applications that includes current traffic patterns to establish when the user will be at a particular location for parking and using workout equipment, cardiovascular classes, massage services, haircut services, shower services, and other exercise and personal hygiene services provided at that location, along with healthy food options for meals or snacks.

The novelty of the present disclosure for improving the health and safety of truck drivers further relates to a system in which the software application incorporates current truck driver location, traveling speed, traffic conditions, distance to next desired healthy stop, availability of the desired services, to calculate the time for arriving at the next healthy stop, and the ability to make reservations for all of the above, when necessary.

Additional novelty of the present disclosure for improving the health and safety of truck drivers and other drivers further relates to a system in which the software application incorporates a rewards system, or utilizes a third-party rewards system, for tracking users' experience and use and rewarding those drivers that use the system. The software app will promote self-care and wellness offerings where drivers mostly stop, such as gas stations, by using the rewards system to also drive desired behavior.

BACKGROUND OF THE DISCLOSURE

A truck driver is an individual that earns a living driving a truck, commonly defined as a large goods vehicle or heavy goods vehicle, such as 18 wheelers, trailer trucks, semi-trucks, semi-trailer truck (combination of a tractor unit and one or more semi-trailers), box truck or a dump truck, among others.

There are three major types of truck drivers. Owner-operators are individuals who own the trucks they drive and can either lease their trucks by contract with a trucking company to haul freight for that company using their own trucks or haul loads for multiple companies. These owner-operators are self-employed independent contractors.

Company drivers are employees of a particular trucking company that drive trucks provided by their employees. Independent owner-operators are those with the authority to haul goods who often drive their own trucks, possibly owning a small fleet anywhere from one to ten trucks.

Truck drivers provide an essential service by transporting goods over land, typically to and from manufacturing plants, retail establishments and distribution centers. Truck drivers are responsible for inspecting their vehicles for mechanical items or issues relating to safe operation. Other individuals are also responsible for services such as sales, cleaning, preparation, and customer service. Truck drivers work closely with warehouse associates and warehouse workers who assist in loading and unloading shipments.

Estimates from the Bureau of Transportation Statistics put the number of trucks operating in the United States at 13 million. Of those, 2.9 are estimated to be tractor trailers. The trucking companies, warehouses and private sector in the U.S. employs an estimated 8.9 million people employed in trucking-related jobs. Nearly 3.5 million of those are truck drivers. As an example, of this figure UPS alone employs 60,000 workers and 9% of those workers are owner operators.

Additionally, the United States economy depends on trucks to deliver nearly 70 percent of all freight transported annually in the U.S., accounting for $671 billion worth of manufactured and retail goods transported by truck in the U.S. alone. Added to that amount is an estimated $295 billion in truck trade with Canada and $195.6 billion in truck trade with Mexico.

In the United States, the hours of service of commercial truck drivers are regulated by the Federal Motor Carrier Safety Administration or FMCSA. For example, commercial motor vehicle drivers are limited to 11 cumulative hours driving in a 14-hour period, following a rest period of no fewer than 10 consecutive hours. Drivers employed by carriers in daily operations may not work more than 70 hours within any period of 8 consecutive days.

In certain situations, drivers must maintain a daily 24-hour logbook record of duty status documenting all work and rest periods. The record of duty status must be kept current to the last change of duty status and records of the previous seven days retained by the driver in the truck and presented to law enforcement officials on demand. In certain instances, Electronic On-Board Recorders or EOBRs can automatically record, among other things, the time the vehicle is in motion or stopped. An FMCSA ruling mandated use of EOBRs, also known as Electronic Logging Device or ELDs, which began on Dec. 18, 2017. The new mandate applies to all carriers not under FMCSA exemptions.

One of the issues facing the truck driving industry is that retention rates are low and a shortage of truck drivers has been reported in the United States. Among other factors for 1 the low rate retention is the demands the profession puts on the body, including sitting for long hours, eating unhealthy food, and drivers having very little time to exercise during long road trips, even with the mandated time off. Exercise facilities are not easily accessible.

In 2006, the U.S. trucking industry as a whole employed 3.4 million drivers. Again, a major problem for the long-haul trucking industry is that a large percentage of these drivers are aging, and are expected to retire. Very few new hires are expected in the near future, resulting in a driver shortage. Currently, within the long-haul sector, there is an estimated shortage of 63,000 drivers. That shortage is expected to increase in the coming years. Trucking (especially the long-haul sector) is also facing an image crisis due to the long working hours, long periods of time away from home, the dangerous nature of the work, the relatively low pay (compared to hours worked), and a "driver last" mentality that is common throughout the industry.

The United States Department of Transportation estimates that over 500,000 truck accidents occur every year, and that commercial trucks are involved in 2.4% of all car accidents. Additionally, Trucks are three times less likely to be in an accident than a regular motor vehicle. Of interest is that one person is injured or killed in a truck accident every 16 minutes.

Estimates of 41,000 to 45,000 traffic deaths occur every year within the U.S. In that estimate, those walking or on bikes account for 15% of the total traffic deaths each year. Fewer than 9% of those deaths involve commercial vehicles. Nearly 5,000 of those deaths are truck related accidents, however, more than 80% of those accidents are the fault of the non-commercial driver. Of those death related accidents 4% of trucks are fatigue related, and drinking related deaths accounted for less than 1% of those accidents.

Quite often, truck drivers and other motorists while driving on long road trips lack convenient access to healthier options due to lack of time or due to places or locations where they generally need to stop. Thus, drivers usually have unhealthy food choices or will buy whatever is in sight because healthier options and self-care services may be out of the area that they need to travel.

In many ways, the trucking and health care industries are similar. Not only are they highly regulated, but they also similarly thrive around the topic of safety. Most notably, much of the information in the marketplace around trucking and transportation safety focuses on the roads, equipment or trucks, and compliance.

The health and wellness industry offers health club memberships, but they may be out of the way for the driver that needs to stick to a particular route or schedule. Usually those memberships are for individuals that live or work close to the health club.

Additionally, grocery stores and food chains may offer healthier food options, but again those options are usually not easily and conveniently accessible to the driver or there is no convenient way to search for these options in a single place.

Alternatively, gas stations and fuel stations have invested in chefs for innovation and possibly healthier food options, but have not provided exercise or similar workout options for drivers on a strict schedule at their facilities. These stations have not made all around health of the driver their focus. Again, these upgraded gas stations are not well known or easily found in a search.

Accordingly, one of the problems that confronts truck drivers is that when on the road there is no easy alternative to eating healthy food and working out in a facility that is convenient, and does not take too much time away from their scheduled route and delivery.

What is needed is a system and method that will provide a truck driver with a list of participating gas or fuel stations and routes to those stations where better meal options and exercise and grooming services are available without searching and overly lengthening the time they need to complete their designated route. Additionally, what is needed is a system that automatically associates the truck driver's time of destination at a particular station and availability of the station for one or more of the services being provided.

Indeed, there is very little information and activity around the health of the truck driver, which ultimately can deliver one of the highest safety controls. Focusing on the driver's health versus the equipment used in the industry is plausibly a greater tangible factor for safer outcomes. In theory, when truck drivers are healthier, they are better prepared for emergency situations, making for a safer environment on the roads.

Various patents and patent applications have attempted to address the disadvantages of the truck driving industry and systems as described herein. One example that pertains to in-vehicle exercise is U.S. Pat. No. 7,740,562, titled Exercise equipment apparatus and method of use in tractor-trailers with sleepers, which discloses an apparatus and method of factory or post-manufacture installation of at least two exercise equipment units in tractor-trailer vehicles with sleepers. The exercise equipment units are stored initially in storage compartments located under beds behind the driver and passenger seats. The exercise equipment units are securely held within the storage compartments by storage locking mechanisms. Each exercise equipment unit is movable manually or electronically from the storage compartment to an operational or use position within the tractor-trailer walking space or sleeping area. In the operational position, the selected exercise equipment unit is secured by an operation locking mechanism in the operational position; adjusted and setup for use by multiple users. The exercise equipment units are connected to a computer for sensing, remote monitoring and displaying of vital signs of at least two users. The selected exercise equipment unit may be returned manually or electronically to either the first or said second storage compartment and re-secured in the storage compartment.

Another patent that pertains to operator fatigue, U.S. Pat. No. 8,652,041, titled Systems and methods for assessing equipment operator fatigue and using fatigue-risk-informed safety-performance-based systems and methods to replace or supplement prescriptive work-rest regulations, discloses a system and method for assessing and modifying fatigue, an input device receives current work-rest pattern and/or sleep data from an individual. A data aggregation and processing platform combines the current work-rest pattern and/or sleep data with previous data related to the individual to generate a fatigue assessment result, a diagnostic assessment result, and a corrective intervention result. At least one output display outputs the fatigue assessment result, diagnostic assessment result and corrective intervention result in a user-readable format to a user. The user uses this information to revise the work-rest pattern to reduce or control future fatigue risk.

Another example, a patent application pertaining to health monitoring is PCT Patent Application No. WO2015138416, titled Health monitoring, which discloses one or more embodiments of techniques or systems for heath monitoring or monitoring one or more health parameters of a user are provided herein. Systems or components of a vehicle may monitor one or more vital or health parameters of an occupant of a vehicle, driver, passenger, etc. For example, a seat may have sensors embedded within that may measure characteristics or attributes associated with the occupant. In one example, a scale may be integrated with the seat to monitor a weight of an occupant on a day to day basis. As another example, a seatbelt or one or more portions of the seat may have heart rate monitors that check a heart rate of an occupant. Additionally, warnings or alerts may be provided when a signature is detected, such as an abnormal heart beat, etc. In this manner, health monitoring may be provided.

However, none of these references successfully addresses the disadvantages and limitations of the truck driving industry that the present disclosure encompasses. At a minimum, none of the references disclose a system or methods that provide for a healthy truck stop, comprising one or more of equipment, classes and healthy meals or snacks along the route that the truck driver is traveling.

Further, none of these references disclose, suggest or teach a website or mobile software application that provides directions and access to stopping locations along the route that can accept the vehicle for temporary parking purposes and provide health equipment and grooming services, such as workout equipment, cardiovascular classes, massage services, haircut services, showers and other exercise and personal hygiene services, along with healthy food options for meals or snacks, to be used and/or consumed in a short time span of an hour or less.

Accordingly, although some equipment and certain services may be provided at some gas stations, health clubs, grocery stores, etc., there are no systems or methods for a truck driver for providing directions to a location, making reservations, when necessary, for exercise, hygiene services and healthy food alternatives accessible in conjunction with a truck driving software application. Nothing like that currently exist. As such, there is no system or methods for facilitating the health and welfare of truck drivers, which in turn would reduce the truck driver turnover rate, increase truck driver health and theoretically, reduce truck-related accidents. The present disclosure satisfies these needs.

SUMMARY OF THE DISCLOSURE

In general, and in order to solve the above-mentioned shortcomings in the truck driving industry, a new system and software application is disclosed, called The Healthy Stop, in which the user, usually a truck driver or individual taking long road trips, uses the app and system, along with third-party or integrated information about the scheduled route, to locate healthy truck stop stations, reserve a particular time for arriving and parking, along with reservations for exercising, taking classes, hygiene and grooming. The application can also integrate with proprietary or third party apps to provide advice on proper and healthier foods to purchase (at the location) for safely driving the truck and transporting goods.

The present disclosure provides access to a location for workouts, self-care, wellness approaches and healthier eating options for meals and snacks, all made more easily accessible while on the road. Drivers using the Healthy Stop app will not have to travel far from their route to access these services, most of which will be a short distance from the route that the truck driver is travelling, such as next to a highway where truck drivers are allowed to park their trucks, or even approximately one mile or less of the route being travelled, again where trucks are allowed to be parked for a short period of time. Drivers can use the app, which will contain or integrate with third-party software applications, such as navigation systems or community-based traffic and navigation software applications, examples of which include WAZE, GOOGLE MAPS or MAPQUEST, to name a few, to determine the location or locations of these Healthy Stops, which will be within their routes, and the time that their current route will get them to those locations, based on the traffic patterns. This information will help minimize or negate driving additional miles to find the different services. The locations can be created specifically for providing the services to truck drivers (or other travelers that use the app), or the services can be integrated into existing or new locations that the drivers already frequent, such as gas stations, or nearby mini-marts.

As an example, once the truck driver's route is established (through existing third-party apps), the system will know that the truck driver is on a route outside for example Nashville at three in the afternoon, and will be near Atlanta in three hours, at six in the evening, taking traffic into account. The system will know that the truck will need to be refueled at that time and that the driver has not exercised that day. The system will prompt the driver, or the driver will initiate, a Healthy Stop at a partner gas station outside Atlanta at that time. The system will check to see if there is availability at the "gym" of a participating location at that time. If so, the system will reserve certain cardiovascular or weightlifting equipment, possibly based on the truck driver's scheduled workout needs (and history), and also reserve a shower time after the workout. If the truck driver has recently performed a cardio work out, the app may suggest that the truck driver perform a weight-lifting workout.

Additionally, the system will check to see if there will be a person at that location, at that timeframe that can give the driver a haircut or massage, which may signal to other partners on the system that at that time, a driver will need those services, at that particular time. A reservation can be set up accordingly. Additionally, the system could review and order various food options at that location based on what food the driver enjoys, or based on the workout performed, and what has been consumed already that day.

As such, at these locations, which will be a part of the system, either contractually or as partners, drivers will be able to get in a quick workout, eat healthier foods and get other convenient services, such as grooming or hygiene, on site while traveling or trucking. Thus, these services will be available with minimal disruption to the trip while on the road. In other words, the Healthy Stop app will create a one-stop, convenient, experience or model for truck drivers to promote healthier lifestyles and ostensibly safety on the road. The app or system rewards the desired healthy behavior, which in turns will change the focus and health status and performance of the drivers, from a strictly business to include healthcare options.

The present disclosure focuses on a "healthier driver to deeply impact safer roads", higher efficiency, performance and productivity. This discloser will assist in changing the face and health status of the commercial truck driving by having exercise equipment and promoting healthier lifestyle options at the most convenient places where drivers frequently visit, the truck stops.

The system and methods described herein, by using the app, along with strategic partners, will create healthier options for the driver while visiting partner fuel stations, for example, so self-care and wellness are not excluded due to problematic access and time constraints. In other words, the system described herein will bring health, fitness and wellness to top of mind.

The general idea is to transform the health and safety for drivers, which will significantly and positively impact the trucking industry, a $792 billion and ever-growing industry, with 3.6 million truck drivers. The average driver is over the age of 50 and has health propensities to either develop or already have high blood pressure, obesity, diabetes, and poor personal grooming habits. Female drivers represent less than 10% of this workforce. The present disclosure should also help attract female drivers, which would assist in reducing the number of drivers currently needed in the industry.

Moreover, the industry has a shortage of at least 80,000 drivers and is in desperate need to attract and recruit more diverse candidates to close or meet supply-chain needs.

As detailed herein, truck drivers will have access to the software applications or app that will provide information, access and scheduling for exercise workout on available equipment in increments of 10 minutes or 15 minutes, or longer based on the driver's schedule.

The drivers will be able to easily reserve time to shower and groom (haircuts, massages, wellness checks, check-ups, etc.) during their stop. Drivers will also be able to order and purchase healthier meals and snacks at the fuel station, if they weren't previously ordered.

The use of the system, including equipment and/or other Healthy Stop services associated with the system, will generate wellness points. In turn, employers can offer/integrate this information into their existing benefit plans for savings or dollars to the driver as an incentive. This feature is an added benefit to partners, and it is a differentiator in the marketplace with downstream revenues Theoretically and from an industry perspective, the cost-benefits are invaluable. Driver productivity will increase, which will generate higher pay and greater revenue. Healthcare cost will ostensibly decrease, so that payors will save money on claims. There will be safer roads due to reduced number of accidents, based on increased mental clarity and focus. Certain disease can be better managed thereby reducing instances of diabetes and high blood pressure, among others. This may also reduce high Medicare and hospitalization expenses in the industry. Importantly, the system can improve the truck driver's overall quality of life.

Additionally, the system can assist in addressing the needs and desires of new entrants in the marketplace, as truck driving becomes healthier and the brand image changes to the positive. This may lead to an increase in women drivers and younger drivers, instead of aging drivers (50 plus) that currently dominate the marketplace.

As such, it is an object of the present disclosure to provide solutions to the many shortcomings in the truck driving industry; to provide a novel system and software application in which the truck driver uses the app and system, along with third-party or integrated information about the scheduled route, to locate healthy truck stop stations, reserve a particular time for arriving, exercising, taking classes, attending to hygiene and grooming.

It is also an object of the present disclosure to provide a system that integrates with proprietary or third party apps to provide location information and arrival time, ability to make reservations, provide advice on proper exercise and healthier food options for purchase, and for safely driving the truck and transporting goods.

These and other aspects, features, and advantages of the present disclosure will become more readily apparent from the attached drawings and the detailed description of the preferred embodiments, which follow.

DRAWING FIGURES

The preferred embodiments of the disclosure will be described in conjunction with the appended drawings provided to illustrate and not to the limit the disclosure, where like designations denote like elements, and in which.

DETAILED DESCRIPTION

Figure 1:
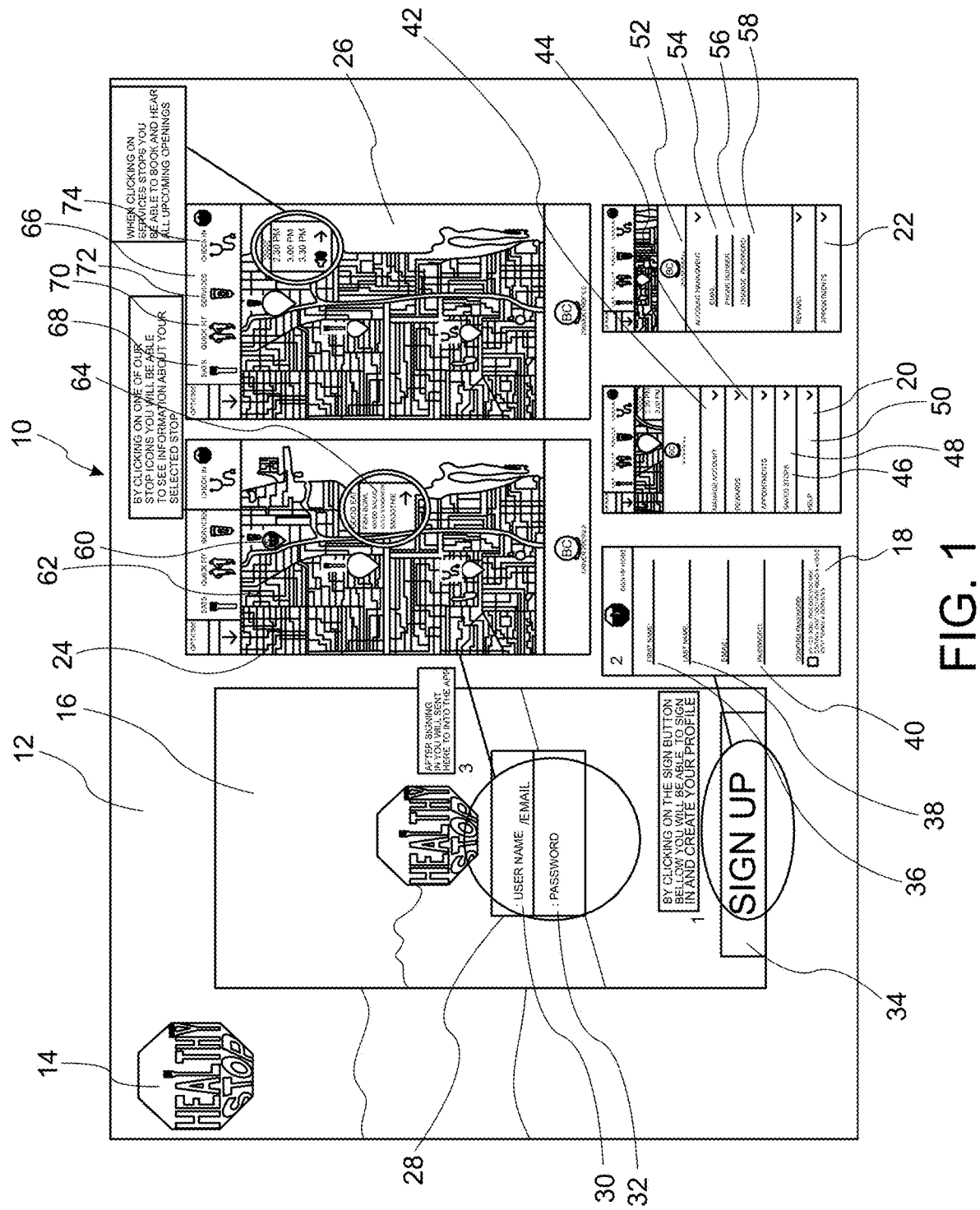
FIG. 1 illustrates an improved software application for a truck driving system and method in accordance with one embodiment of the present disclosure.

Referring to the drawings, wherein like reference numerals refer to the same or similar features in the various views, the present disclosure pertains to an improved truck driving system and methods for improved truck driving, including in order to solve the well-known shortcomings in the truck driving industry, the new system and software application, called the Healthy Stop, in which a truck driver or individual taking a long road trip, uses the app and system, along with third-party or integrated information about the scheduled route, to locate healthy truck stop stations, reserve parking, when necessary, reserve a particular time for arriving (based on the integrated navigational tools), exercising, taking classes, attending to hygiene and grooming. The application also integrates with proprietary or third party apps to provide advice on proper and healthier foods to purchase (at the location) and for safely driving and transporting goods.

FIG. 1 shows a view of the various screen shots of the software application 10 for the Healthy Stop Truck Driver app on a display 12, such as a mobile cellphone, as understood by one having ordinary skill in the art. The display 12 may be shown on a mobile phone, personal digital assistant, computer screen, iPad, or similar device that has a screen output. The name of the app (in this case the Healthy Stop) 14 is displayed in the upper left corner, although it could be located anywhere on the display.

The app 10 consists of numerous screen shots or pages 16, 18, 20, 22, 24, 26 that allow the user to move through the app to make reservations at the particular Healthy Stop location. The initial screen when accessing the app shows the name 14 on the display and provides a log in or login page 16, which allows the user to enter information into the login section 28 by entering a proper user name 30 and password 32. The user name 30 could be the user's email address and the system can also be configured to save the login 28 information, so that the user can skip this page, once the proper credentials have been entered.

To the extent that the user has not properly signed up, the sign up section 34 allows the user to move to the first sign up page 18 in which user information is entered, such as first name 36, last name 38, email address 40, among other fields. Once entered, the system displays the second sign up page 20, in which additional information is provided, such as the ability to manage the account 42, track rewards 44, follow appointments 46, save stops 48 and get help 50.

Finally, the last page of the sign up section 34 pertains to the driver profile 52. This page allows the driver to manage the account by entering email address 54, entering phone number information 56 and changing the password 58. Additionally, the user can input information about himself or herself that pertains to the various aspects of tracking the driver to assist with the healthy options. These can include a workout or eating regiment, how long the driver can travel before needing to take a break (either by law, or for other reasons), how often the driver needs a haircut, and other driver specific data.

Once the driver has signed up, the proper user name 30 and password 32 can be entered back on the log in page 16 and the driver can enter use the app 10. The system 10 will display the map page 24, where the driver can see the different stop locations 60 in the area on the map 62. By selecting one of the locations 60, the system 10 will display particular location information 64. The system 10 can display a banner 66 that allows the driver to select what services to be used. For example, the banner 66 can display Eats 68 for information about food at that location; Quick Fit 70 for information about exercise at that location; Services 72 for hygiene, grooming and massages services, etc. at that location; and Check In 74 for health and wellness check-ups at that location.

The following selection page 26 allows the driver to hear the services 68, 70, 72, 74 and select and reserve particular services and times for when the driver arrives at the particular location, based on the navigation app or when the driver plans on arriving in a location. The driver can then go back to the previous page 24 and select additional services 68, 70, 72, 74 or finish with the order. The system 10 will then inform the driver of the services reserved or to be reserved. When the driver arrives at the particular location, the parking spot, exercise equipment 70, or other reserved services, such as the massage therapist 72, will be waiting for the driver. The massage therapist may have just received a notice that a driver was going to be at that particular location and accepted the services.

Additionally, the app 10 can provide nutritional information pertaining to the food available at the truck stop for assisting in choosing a healthier diet. The app 10 can also provide video clips or access to video clips showing the driver a proper workout inside the truck or right outside the truck once parked (as opposed to using the facilities at the truck stop or stop location). The app 10 can also allow the driver to set up one-on-one calls or attend group calls with an exercise instructor or a nutritionist for assistance in meeting the driver's exercise and nutrition goals.

To the extent that weights or mats or other gym equipment is necessary for the workout, those items may be available for purchase or rental at the truck stop. The app 10 can provide that information. When the services or work out has been completed, the driver can eat the ordered food 68 at the location or take it to go on the road.

Figure 2A:
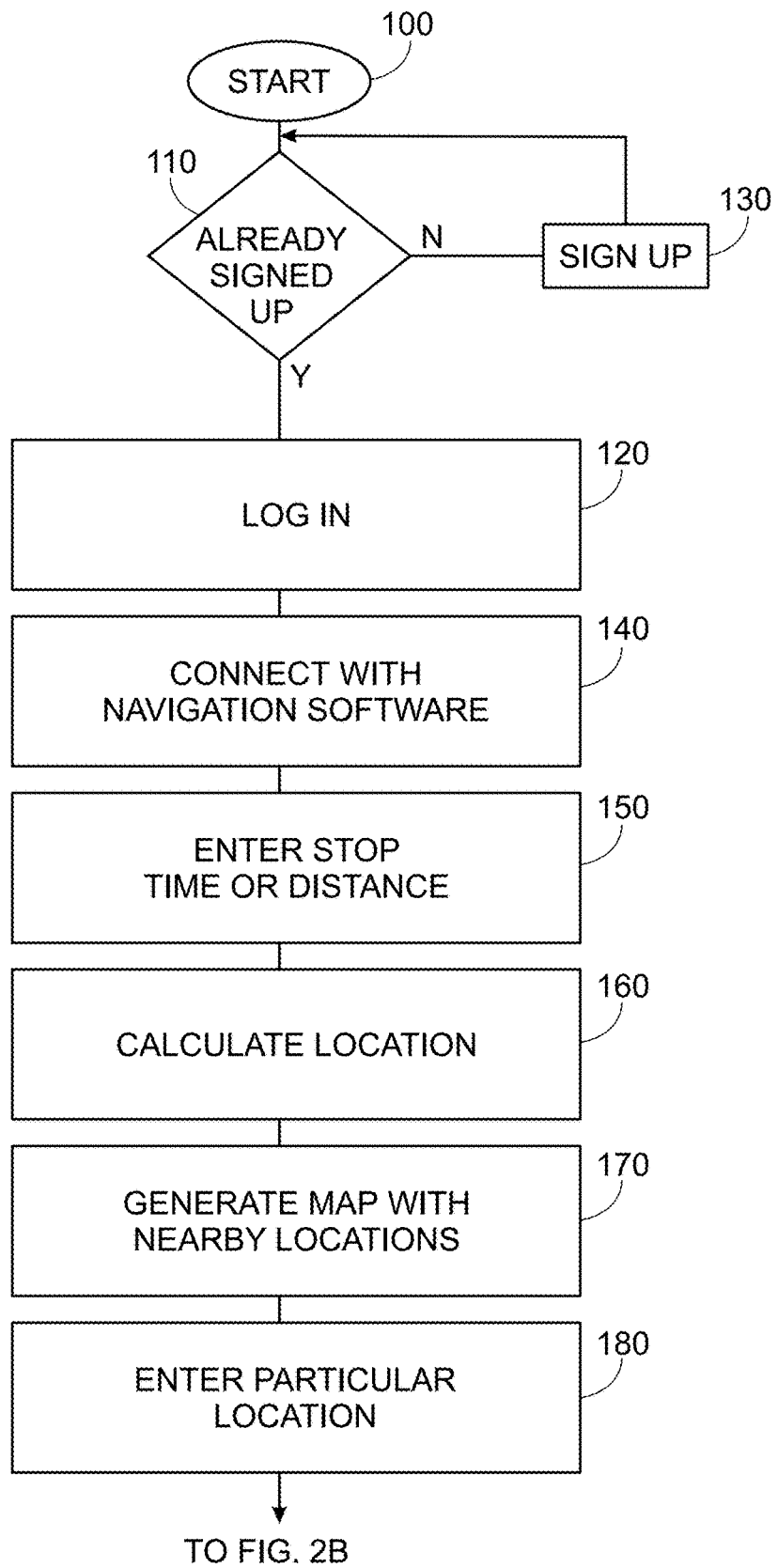
FIGS. 2A and 2B illustrate a flow chart of a software application for an improved truck driving system and method in accordance with one embodiment of the present disclosure.
Figure 2B:
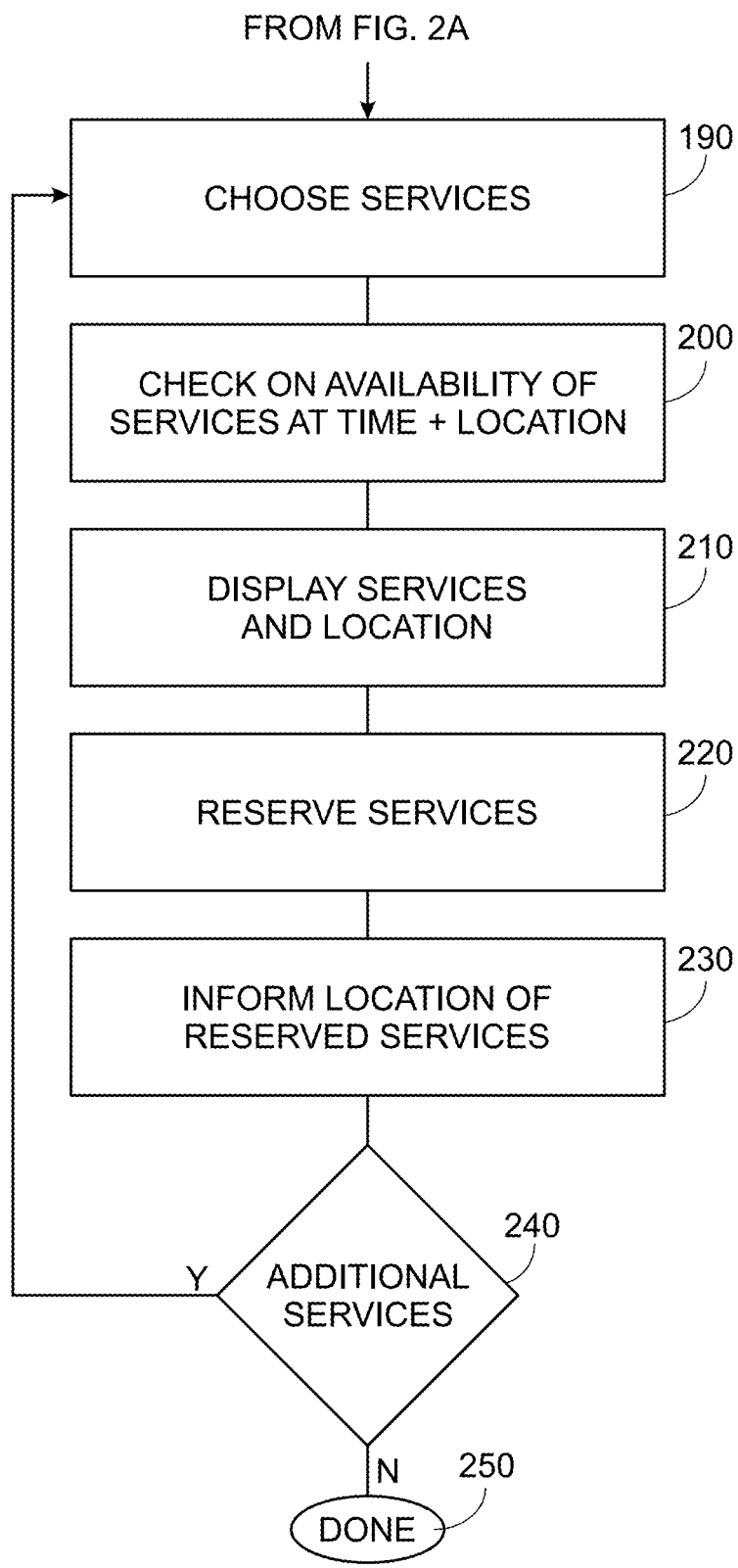

FIG. 2 shows a flow chart of the software app 10 for the Healthy Stop Truck Driver app. The first step is to start the app 100. The system 10 will ask if the driver is already signed up 110. If so, the driver can go to the login step 120 and if not, the driver will have to sign up 130 as described above. There are a number of ways to sign up and various information that is required as understood by one having ordinary skill in the art.

Once the driver has signed up 130, the log in section 28 is accessible in step 120 and the user enters the user name 30 and password 32 to access the app. Next, the system 10 is connected to the external or proprietary navigation system 10 at step 140. This will allow the driver to select stop locations 60 based on location and arrival time. The integrated navigation system 10 will also provide the necessary map or mapping 62 of the truck on the route and provide an estimated time to arrive for the goods or services reserved.

The driver can input the time to drive until the need to stop, or the distance to travel before the need to stop. At step 150, the driver can enter the predetermined time to stop or the predetermined location 64 for the stop. If the time is entered, the system 10 will determine the approximate location and the nearby particular locations 60 for the user to use at step 160.

The system 10 with then generate a map 62 at step 170 of the particular nearby healthy stop locations 60. Additionally, the system 10 may determine, based on certain parameters, such as time already traveled, time of day or night, last meal, etc., a good time to stop.

At step 180, the driver then decides on a Healthy Stop location 64 from the map 62. The decision can also be based on the particular services provided at the nearby locations 60, or based on previous stops at that location. At step 190, the driver selects the services to be reserved, and at step 200, the system 10 checks for availability of those services at that particular chosen location 64.

The system 10 then displays the services, times and location 64 at step 210, and the driver then reserves the services at step 220. The system 10 then checks for availability, reserves the services at that location 64 at step 230. If there is no availability, the system 10 will inform the driver and provide other options.

The driver is then asked (or lets the system 10 know) if additional services are desired at step 240. If there are no additional services desired, the system 10 ends at step 250. Otherwise, the system 10 goes back to step 190 so the driver can choose additional services.

A particular Healthy Stop location may get a small percentage of each of the services or goods that are ordered on the app 10 at that location. This may incentivize each location to provide better services and goods to the drivers (for repeat business).

Each particular Healthy Stop can provide additional or unique services and/or goods for the users of the system 10. For example, a Healthy Stop location that is located in bad weather may include special parking places closer to the building reserved solely for users of the system 10. Another option is to provide larger showers with premium soaps and shampoos for users of the app 10. These services may incentivize the drivers to use the system 10.

It will be understood that the embodiments of the present disclosure, which have been described, are illustrative of some of the applications of the principles of the present disclosure. Although numerous embodiments of this disclosure have been described above with a certain degree of particularity, those skilled in the art could make numerous alterations to the disclosed embodiments without departing from the spirit or scope of this disclosure.

All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosed system and methods.

Additionally, joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosed apparatus, system and methods as disclosed herein.

What is claimed is:

1. A method for improving the health and safety of a truck driver, the steps comprising:
   (a) providing a software application to allow said truck driver driving a scheduled route entered into a navigation software application, to access one or more healthy stop locations, said one or more healthy stop locations allowing for the truck driver to reserve a parking spot ahead of time, provide workout equipment and exercise and cardiovascular classes, and personal hygiene and grooming services, said one or more healthy stop locations being located a mile or less from the scheduled route said truck driver is travelling;

(b) using said navigation software application to calculate the arrival times at said one or more healthy stop locations;

(c) displaying to said truck driver said one or more healthy stop locations;

(d) displaying to said truck driver said arrival times at said one or more healthy stop locations, said arrival times based on said current traffic patterns and said scheduled route entered into said navigation application by said truck driver;

(e) allowing said truck driver to determine one or more healthy services provided at each of said one or more healthy stop locations said healthy services comprising one of reserving a parking spot at a particular time, providing workout equipment and exercise and cardiovascular classes, and providing personal hygiene and grooming services;

(f) generating a list of healthy services provided at each of said one or more healthy stop locations;

(g) displaying to said truck driver said list of healthy services provided at each of said one or more healthy stop locations;

(h) allowing said truck driver to select a preferred healthy stop location of said one or more healthy stop locations;

(i) allowing said truck driver to select a preferred healthy service from said list of healthy services at said preferred healthy stop location;

(j) reserving said preferred healthy service for said truck driver at said preferred healthy stop location based on the arrival time that said truck driver will be arriving at said healthy stop location (k) notifying a person registered to provide the preferred healthy service of said arrival time of said truck driver at said preferred healthy stop location, thereby allowing the person registered to meet the truck driver at the arrival time at the preferred healthy stop location.

\* \* \* \* \*